Nov. 12, 1935.  E. G. ROMEISER  2,021,023
FITTING FOR ELECTRIC WIRE CONDUITS
Filed April 3, 1930   5 Sheets-Sheet 1
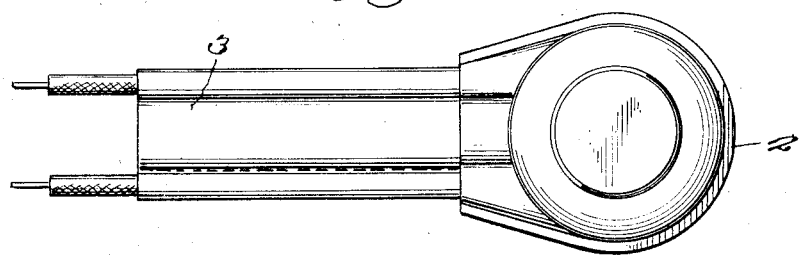
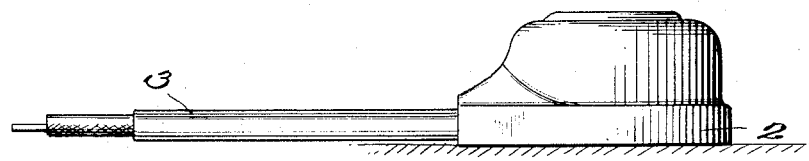
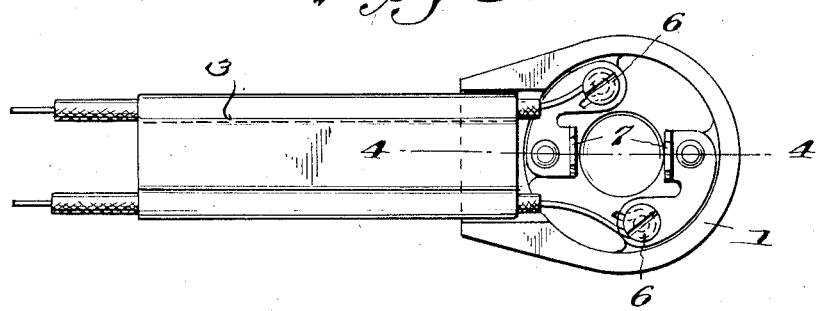
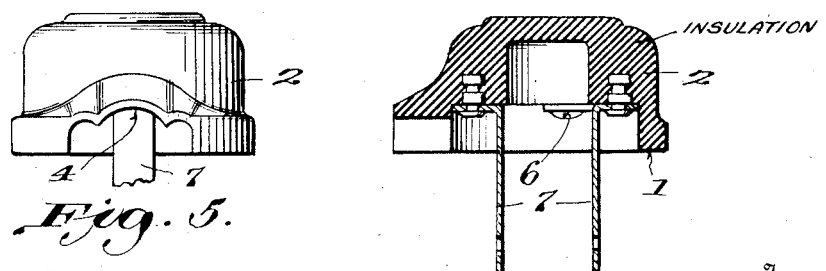
Inventor
ERNEST G. ROMEISER,
By Dyre and Kirchner
Attorneys Inventor
ERNEST G. ROMEISER,
By Dyre and Kirchner
Attorneys Nov. 12, 1935.  E. G. ROMEISER  2,021,023

FITTING FOR ELECTRIC WIRE CONDUITS

Filed April 3, 1930  5 Sheets-Sheet 3

Inventor

ERNEST G. ROMEISER,

By Dyre and Kirchner

Attorneys

Nov. 12, 1935.  E. G. ROMEISER  2,021,023
FITTING FOR ELECTRIC WIRE CONDUITS
Filed April 3, 1930  5 Sheets-Sheet 4

Inventor
ERNEST G. ROMEISER,
By Dyre and Kirchner
Attorneys

Nov. 12, 1935.  E. G. ROMEISER  2,021,023
FITTING FOR ELECTRIC WIRE CONDUITS
Filed April 3, 1930  5 Sheets-Sheet 5
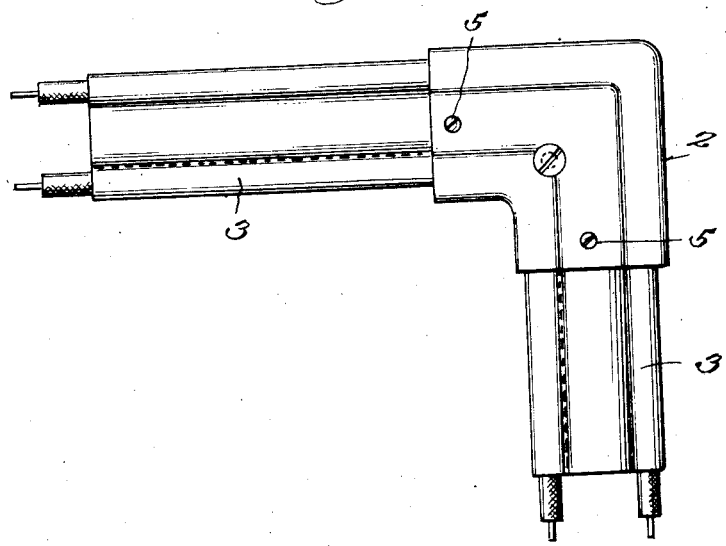
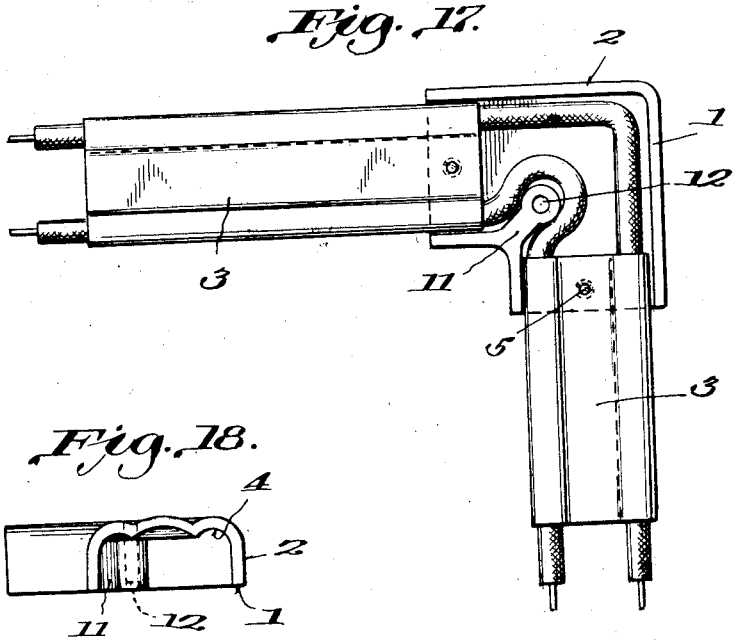
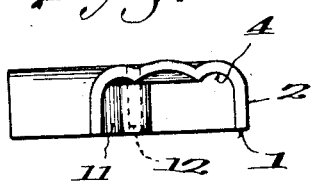
Inventor
ERNEST G. ROMEISER,
By Dyre and Kirchner
Attorneys Patented Nov. 12, 1935

2,021,023

UNITED STATES PATENT OFFICE 2,021,023

FITTING FOR ELECTRIC WIRE CONDUITS

Ernest G. Romeiser, Union City, Ind., assignor to Robert C. Schemmel, Union City, Ind.

Application April 3, 1930, Serial No. 441,363

1 Claim. (Cl. 173—324)

My invention relates to fittings including plugs, switches, adapters, corner caps and the like, adapted to be used in connection with electric wire conduits, especially the types shown and described in United States Letters Patent Nos. 1,713,302, 1,798,035, and 1,841,257 issued to Robert C. Schemmel.

An object of my present invention is to provide fittings of the character indicated which are adapted to make a snug and attractive contact with the upper surface of the conduit, fitting tightly down in place thereupon and engaging on the under surface thereof with any suitable support, such for example as a wall, baseboard, ceiling, floor, or other portion of the interior of a building.

Another object of the invention is to provide fittings containing parallel interior runs for the conducting wires, and provided with electric contact members disposed between said runs, in order to permit the outlet from the member to be disposed in series or in parallel.

A further object is to provide electric conduit fittings having an under surface configuration adapted to make and maintain snug contact with the upper surface of the conduit.

A further object is to provide electric conduit fittings having one or more perforations therein adapted to receive fastening means such as brads or nails, which may be passed through the fitting and through a portion of the conduit for the purpose of securing fitting and conduit together, and both to the base or support.

Other and further objects of my present invention will sufficiently appear from the description of the invention hereinafter, taken in conjunction with the accompanying drawings, in which certain preferred forms of embodiment are illustrated.

In the accompanying drawings which form part of this application for Letters Patent, and in which the same reference characters indicate the same part in the different views, Figure 1 is a top plan view of an attachment plug adapted to be connected to an electric wire conduit and to effect electrical connection with a floor or baseboard socket;

Fig. 2 is a side elevational view of the same;

Fig. 3 is a bottom plan view of the same;

Fig. 4 is a vertical central sectional view taken on the line 4—4 of Fig. 3;

Fig. 5 is a front elevational view of the plug;

Fig. 16 is a top plan view of a corner cap;

Fig. 17 is a bottom plan view of the same; and

Fig. 18 is a front elevational view thereof.

Figure 6:
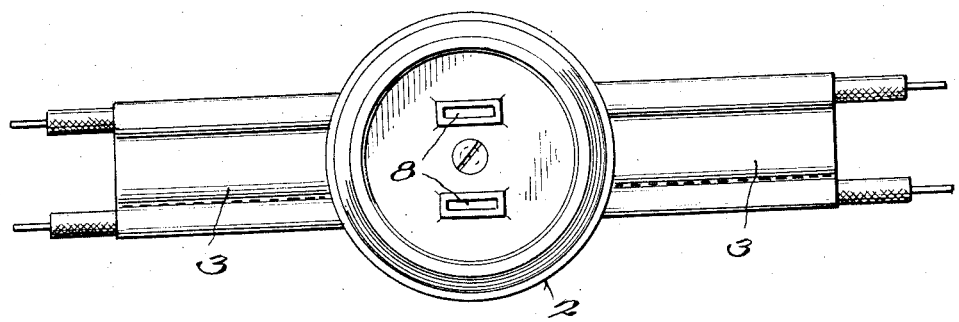
Fig. 6 is a top plan view of an outlet socket.

As hereinbefore stated, my present invention contemplates broadly fittings adapted to be used in connection with the electric wire conduits disclosed in the R. C. Schemmel United States No. 1,713,302, Reissue No. 17,691, No. 1,798,035 and No. 1,841,257. These prior inventions have provided electric wire conduits adapted to be secured along any suitable surface. It will be appreciated that the use of such conduits, as well as the conduits of the prior art, requires a variety of fittings, for the purpose of making connection with other electric circuits and electrically operated devices, making and breaking the circuit, etc. I have found that the fittings of the prior art are not well adapted to use in connection with the new conduits, and I have accordingly provided the series of fittings which form the subject of the present application for Letters Patent. The present fittings, however, embody certain novel features and principles of construction which render them well adapted to use in connection with a wide variety of conduits for electric wires, and my present invention is therefore by no means to be considered limited in its broader aspects to the combination of the patented conduit and those which are now the subject of pending applications with the novel series of fittings which will now be described in detail.

One essential characteristic of the present series of fittings is their under surface, the form of which is common to each of them, being designated 1 in the drawings. This under surface 1 comprises the bottom edge of a side wall 2, and is disposed all in a single plane, so that a flush contact with the flat surface of a support is made possible. In order to provide for an entrance of the conduit 3 into the hollow interior of the fitting, the bottom edge of the side wall 2 is depressed in one portion to a depth equal to the thickness of the conduit and for a distance equal to the width of the conduit. The bottom edge of the resulting shortened portion of side wall is shaped to conform closely to the upper surface of the conduit as shown at 4 in the configuration of the drawings, so that when the fitting is secured in operative relation to a section of conduit, the engagement of their surfaces is tight and snug, and the contacting areas of the fitting and the support to which it is secured are likewise associated in close and dustproof relation.

Those of the fittings which are by the nature of their function adapted to be more or less permanently fixed in place are provided with a suitable perforation 5, and if the character of the association of the conduit with the fitting is such that the conduit completely traverses the area of the fitting, the perforation 5 is so located that a tack, nail, screw or the like passed through it and into the support beneath it will pass also through the central part of the conduit between the conducting wires. In this way a single fastening means serves to secure the fitting and conduit together and both to the support beneath them.

The bodies of the fittings are conveniently made of a molded condensation product or similar non-conducting material, according to the well known practice of the art. The interior of the different types of fitting varies with the nature of their function.

Figs. 1 to 5 illustrate an attachment plug for use in making ready connection between the circuit of the conduit 3 and a common floor or wall outlet carrying a house current. The plug contains two contact elements 6 which are electrically connected each to a depending prong or blade 7 adapted to penetrate corresponding sockets in the wall or floor outlet.

Figure 7:
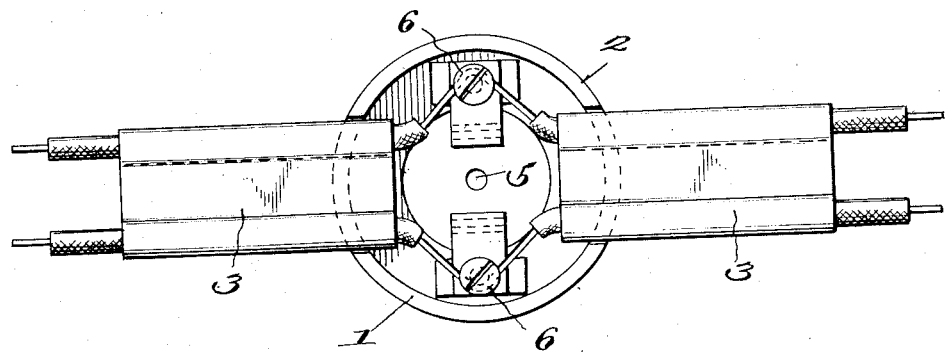
Fig. 7 is a bottom plan view of the socket of Fig. 6.
Figure 8:
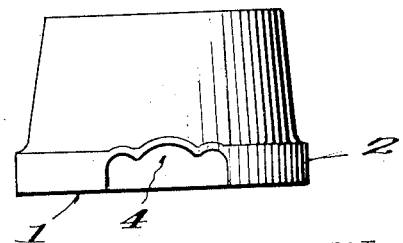
Fig. 8 is a front elevational view of the socket.

Figs. 6 to 8 illustrate an outlet adapted to be used in connection with an ornamental conduit, and contains two contact elements 6 which are engageable by the prongs or blades of a suitable plug member (such as shown in Figs. 1–5) when inserted in the sockets 8.

Figure 9:
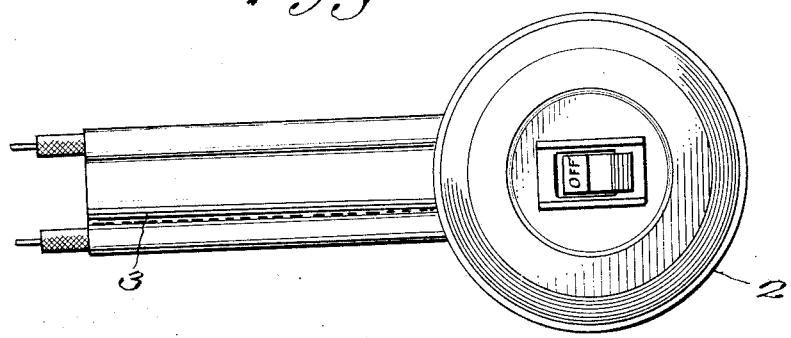
Fig. 9 is a top plan view of a switch.
Figure 10:
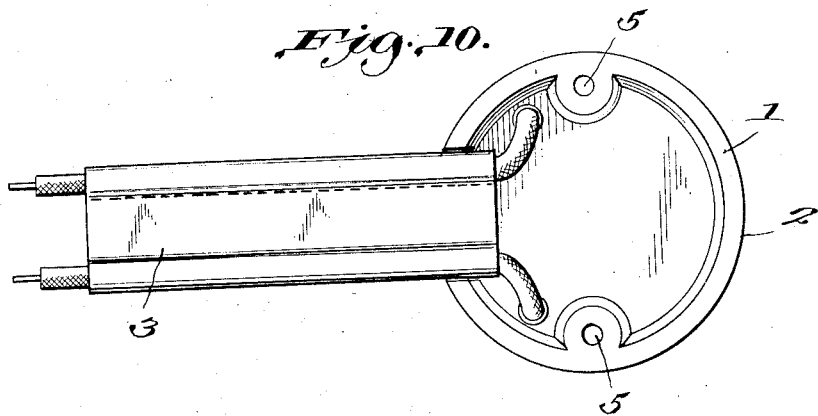
Fig. 10 is a bottom plan view of the switch of Fig. 9.
Figure 11:
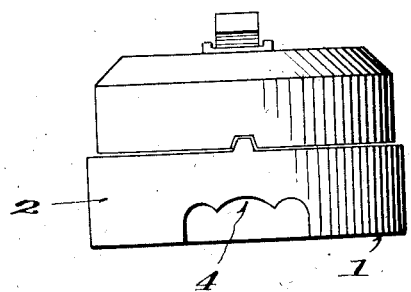
Fig. 11 is a front elevational view thereof.
Figure 12:
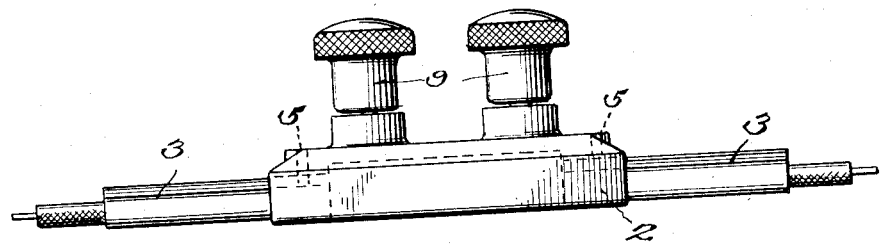
Fig. 12 is a side elevational view of a binding post adapter.

Figs. 9 to 11 show a switch. I have shown only the outer shell, containing the novel entrance opening for the conduit. The inner working parts may be of any well known construction.

Figs. 12 to 15 show a binding post adapter. This device is provided with the novel entrance opening for the conduit which is common to all the fittings illustrated in the accompanying drawings, and contains in addition certain other novel features which will be briefly indicated.

Figure 13:
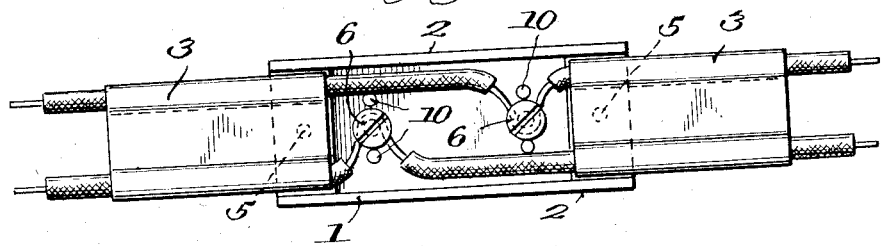
Fig. 13 is a bottom plan view of the adapter showing the wires of the conduit connected in parallel.
Figure 14:
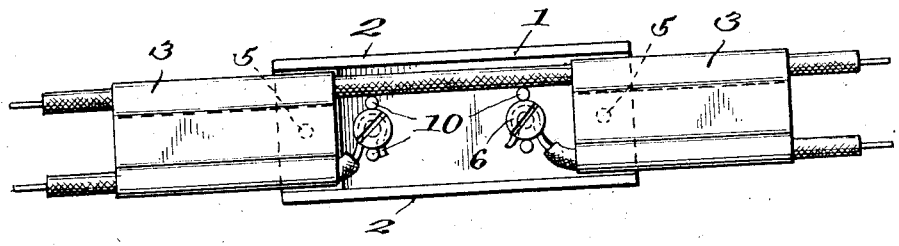
Fig. 14 is a bottom plan view of the adapter showing the wires of the conduit connected in series.
Figure 15:
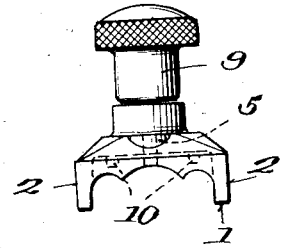
Fig. 15 is a front elevational view of the adapter.

The base block of the adapter is provided with two contact elements 6 disposed in spaced relation along the longitudinal axis of the adapter. These contacts 6 consist of headed screws engaging threads formed on the inside of binding posts which project upwardly through the block and carry on their upper ends suitable milled edged binding post nuts 9. Connection is made between the wires of the conduit and the contact elements 6 by removing a short length of the wire covering material of the conduit, baring short sections of the wires and engaging the bared wire with the contacts. The tandem position of the contacts enables parallel or series connections to be made with equal facility, as shown in Figs. 13 and 14 respectively. Short posts 10 integral with the material of the adapter block positioned close to the contact element 6 and between the element and the longitudinal edge of the block serve to guide and maintain the wire of the conduit in engagement with the proper element 6. Perforations 5 are provided in the block in alignment with the elements 6 at substantially the center of the entrance openings 4 for the conduit 3, so that a nail or tack passed through each of these perforations will penetrate the conduit and enter the support, to hold block, conduit and support securely together.

Figs. 16 to 18 show a corner cap, the function of which is to hold the conduit 3 securely in place around angled corners. This cap consists essentially of two portions making with each other any required angle, the side walls terminating in a single plane and the outer end wall of each portion being provided with the novel entrance opening 4 which has been described. As will be appreciated, the turning of the conduit around a right or acute angle results in a great deal of buckling of the inner edge of the conduit. To eliminate the unsightly appearance of this buckling I remove a short section of the wire covering material of the conduit, preferably leaving the insulating material (if any) surrounding the wires intact. The excess length of the inner wire is taken up by disposing it in a loop in a cavity inside the cap, and is held securely in this position by a tongue 11 of material integral with the block extending into the inside cavity from the inner vertex of the angle. A convenient means for securing the cap to the support is provided by a perforation 12 formed through the block in the inner end of the tongue 11, through which a tack or nail may be passed into the support, or by perforations 5 in the top of the conduit entrance opening 4, so that, as in the case of the binding post adapter, tacks or screws passed through the perforations 5 will hold cap and conduit together, and both to the support.

While I have shown the novel features of the present invention embodied in several types of electric fitting devices, it is to be understood that the invention is capable of exemplification in other and further specific forms. All such modifications, to the extent that they embody the principles of the invention as pointed out in the appended claim, are to be deemed within the scope and purview thereof.

Having thus described my present invention what I claim and desire to secure by Letters Patent is:

A fitting for a conduit for electric wires comprising a hollow block having opposite side walls terminating in a single plane and end walls indented from said plane to provide an entrance recess for the conduit, the roof of the recess being configured to conform to the shape of the upper surface of the conduit, and the block being perforated at substantially the center of the recess to receive fastening means adapted to pass through the conduit and into a support, in combination with contact elements disposed in spaced relation along the longitudinal axis of the block and posts formed in the block and disposed adjacent to the contact elements to position the wires of the conduit in engagement with the contact elements.

ERNEST G. ROMEISER.